(No Model.)  2 Sheets—Sheet 1.
W. E. KOCH & F. M. SHOOK.
CORN PLANTER.
No. 423,520. Patented Mar. 18, 1890.
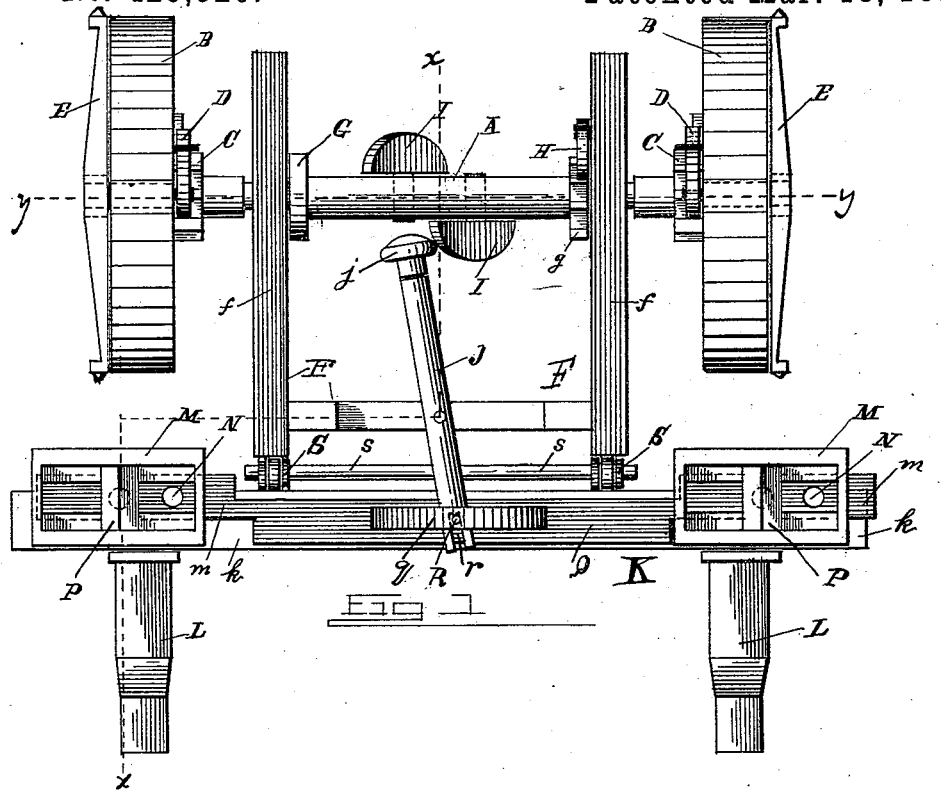
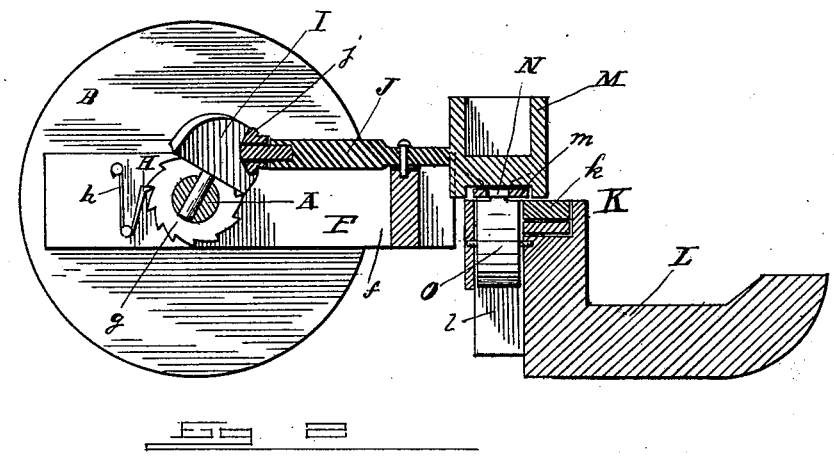
WITNESSES
INVENTOR
W. E. Koch and F. M. Shook
Attorney (No Model.) 2 Sheets—Sheet 2.
W. E. KOCH & F. M. SHOOK.
CORN PLANTER.
No. 423,520. Patented Mar. 18, 1890.
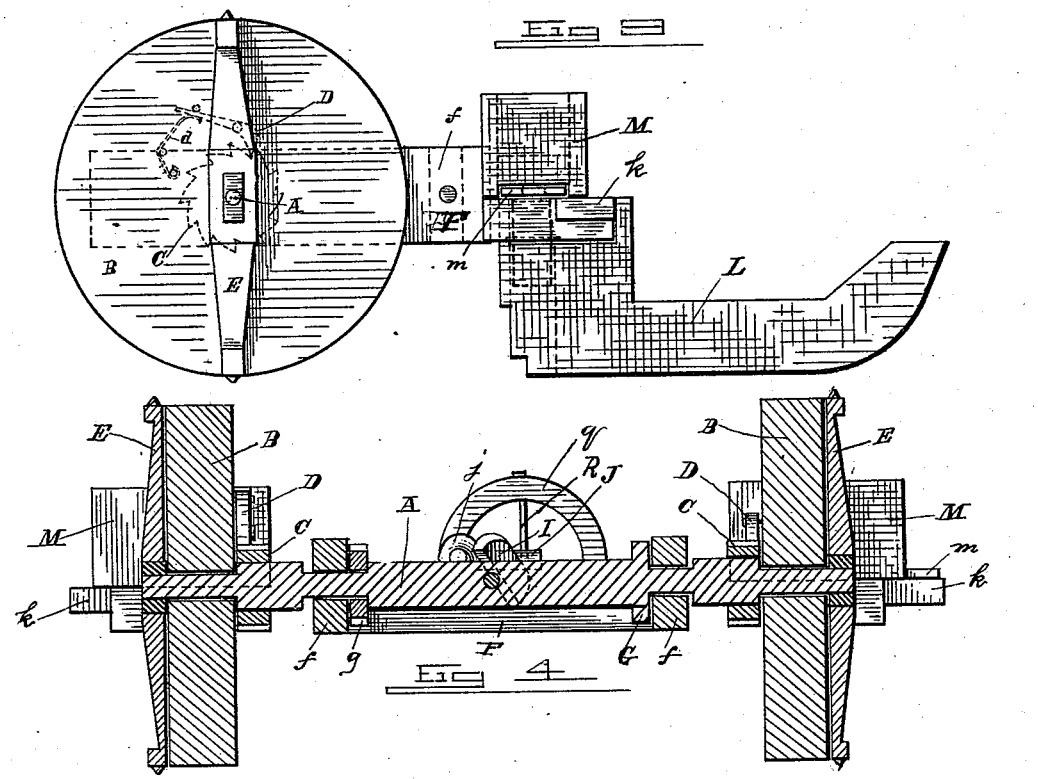
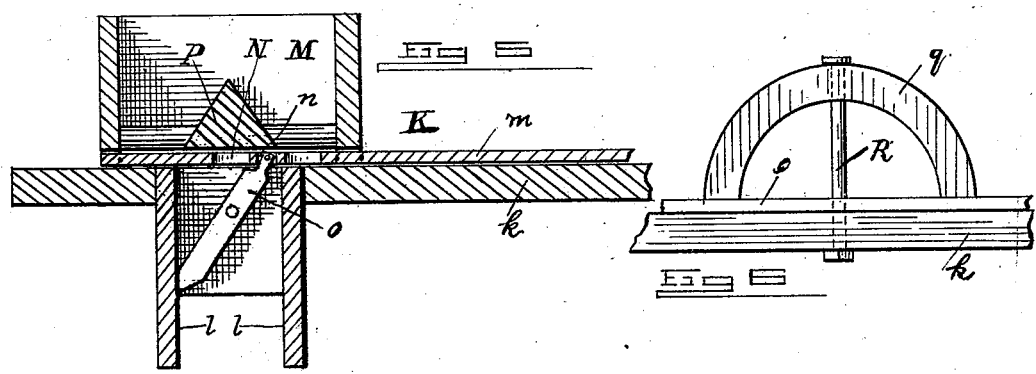
WITNESSES
INVENTORS:
W. E. Koch
F. M. Shook
by
Attorney

UNITED STATES PATENT OFFICE.

WILLIAM E. KOCH AND F. MARION SHOOK, OF ASHVILLE, OHIO.

CORN-PLANTER.

SPECIFICATION forming part of Letters Patent No. 423,520, dated March 18, 1890.

Application filed April 29, 1889. Serial No. 308,985. (No model.)

*To all whom it may concern:*

Be it known that we, WILLIAM E. KOCH and F. MARION SHOOK, of Ashville, in the county of Pickaway and State of Ohio, have invented certain new and useful Improvements in Corn-Planters; and we do hereby declare that the following is a full, clear, and exact description thereof, reference being had to the accompanying drawings, and to the letters of reference marked thereon, which form part of this specification, in which—

Figure 1 is a plan view of our improved planter. Fig. 2 is a longitudinal sectional view of the same on line $x\,x$, Fig. 1. Fig. 3 is a detail side elevation. Fig. 4 is a sectional view on line $y\,y$, Fig. 1. Fig. 5 is a detail sectional view of a feed-box, and Fig. 6 is a detail view of the yoke.

This invention is an improvement in seeding-machines, and is especially designed for planting corn or other grain in hills at regular distances apart and for marking the ground between the hills to indicate the path of the machine in planting succeeding rows; and to these ends the invention consists in the novel construction and combination of parts in the planter, which will be hereinafter clearly described and claimed.

Referring by letters to the accompanying drawings, A designates the axle of the machine, upon the ends of which are wheels B B, which can turn freely on the axle.

C C are ratchet-wheels rigidly secured on the axle to the inside of the wheels B, and D D are dogs pivoted on the inner faces of the wheels and engaging said ratchets and controlled by springs $d$, also mounted on the wheels, so that when turned backward the wheels do not affect the axle, but when turned forward the dogs engage the ratchets and turn the axle forward also.

E E designate the markers, each formed of a bar about equal in length to the diameter of wheels B and secured centrally and rigidly to the ends of axle A outside and close to wheels B. The ends of these markers may be provided with studs or pointed, so that when they revolve forward with the axle they prod and mark the ground at each half-revolution of wheels B forward.

F designates a frame having two side bars $f\,f$, loosely journaled or supported on the axle, which turns freely therein between ratchet-wheels C C, being prevented from lateral movement by a collar G and a ratchet $g$, fixed on the axle. Ratchet $g$ is engaged by a dog H, pivoted on the adjoining bar $f$ and controlled by a spring $h$ when the machine is moved backward, locking the axle and preventing its rotation backward with wheels B.

I I designate two wings or cams secured diametrically opposite each other and about centrally of axle A. These wings have wide heads which lie diagonally of the axle, as shown, and alternately engage a roller $j$ on the end of a bar J, pivotally mounted on the front transverse bar of frame F, as shown, and impart a horizontal reciprocating motion to said bar during each revolution of the axle.

K designates the seeding-frame carrying the seed-hoppers, and consisting of a horizontal bar $k$, lying parallel with and in front of axle A, and supported at each end upon the furrow-opening runners L L, which are of any suitable construction and move in front of wheels B, and above these runners are the seed-boxes M M, having a bottom feed-slide $m$, formed with two feed-perforations N N and a central intermediate slot $n$, in which is engaged the upper end of a valve O, which is centrally pivoted in the dropping-openings $l\,l$ of runners L, as indicated, so that the valve catches the grain dropped through plate $m$ near the bottom and delivers it into the furrow at the proper time and close to the ground, so that it will not be scattered in the furrow.

P designates a transverse cut-off in the center of boxes M, by which the slide is cleared of superfluous grain, and escape of grain except through the openings of the slide as it reciprocates thereunder prevented.

The slides $m\,m$ are rigidly connected to a longitudinal bar Q, lying on bar $k$ and having a yoke $q$ at center, through which passes the front end of bar J, which is bifurcated or slotted, as shown at $r$, and through which passes a vertical bolt R, which is fixed in yoke $q$ and in the bar $k$, as shown. By this arrangement the oscillations of bar J by the means described impart a reciprocating motion to the slides $m$, one back and one forward movement being given to each slide during one revolution of the axle.

The frame K is hinged to frame F by eyes

S S and rod s, as indicated in the drawings, to permit the frames to ride over inequalities of the ground without strain or binding.

In starting the machine the axle is turned until the markers are upright and the dropping-slides at one end of their stroke. As the axle can turn independently of the wheels, this can be readily done. Then the machine is driven forward and the markers imprint the ground half-way between each hill dropped, enabling the driver of the machine to readily see where the machine should be started in the return row, since if the markers are made to register their marks in the going and return drives across the field the hill planted will be uniform both transversely to the line of planting as well as in the rows themselves. By increasing the number of cams the number of oscillations of the feed-slides are increased.

The mounting of the axle permits the machine to be moved backward without affecting the seed-dropping devices, as is apparent.

Having thus described our invention, we claim—

The herein-described corn planter and marker, consisting of the seeding-frame having seed-boxes and runners and a slide-bar Q thereon for operating the feed-slides, in combination with a frame F, hinged to the seeding-frame and having a front transverse bar, an oscillating lever J, pivoted on said bar and loosely engaging a yoke on slide-bar Q at its front end, the axle A, loosely mounted in frame F, the collar G and ratchet $g$ on the axle within frame F, the dog H thereon, engaging ratchet $g$, and the wings I I on the axle for oscillating bar J, the ratchets C C on the axle exterior to the frame, the wheels B B, loosely mounted on the axle, the spring-controlled dogs D D on the wheels, engaging ratchets C, and the markers E E, rigidly mounted on the ends of the axle, all substantially as specified.

In testimony that we claim the foregoing as our own we affix our signatures in presence of two witnesses.

WILLIAM E. KOCH.
F. MARION SHOOK.

Witnesses:
J. T. FISHER,
C. D. NISSMITH.